(12) United States Patent
Kuieck et al.

(10) Patent No.: US 12,017,168 B2
(45) Date of Patent: *Jun. 25, 2024

(54) AQUEOUS FLUID FILTER ASSEMBLY WITH AERATION MITIGATION

(71) Applicant: SHAW DEVELOPMENT, LLC, Bonita Springs, FL (US)

(72) Inventors: Bryan Kuieck, Bonita Springs, FL (US); Patrick Greivell, Bonita Springs, FL (US); Michael O'Hara, Bonita Springs, FL (US); Eric Gress, Bonita Springs, FL (US)

(73) Assignee: SHAW DEVELOPMENT, LLC, Bonita Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,294

(22) Filed: Dec. 5, 2022

(65) Prior Publication Data

US 2023/0102136 A1    Mar. 30, 2023

Related U.S. Application Data

(63) Continuation of application No. 17/264,393, filed as application No. PCT/US2019/044047 on Jul. 30, 2019, now Pat. No. 11,517,838.

(Continued)

(51) Int. Cl.
*B01D 36/00* (2006.01)
*B01D 29/15* (2006.01)
(Continued)

(52) U.S. Cl.
CPC .......... *B01D 36/001* (2013.01); *B01D 29/15* (2013.01); *B01D 35/18* (2013.01); *B01D 53/9431* (2013.01); *B01D 2201/291* (2013.01)

(58) Field of Classification Search
CPC ...... B01D 36/001; B01D 29/15; B01D 35/18; B01D 53/9431; B01D 2201/291;
(Continued)

(56) References Cited

U.S. PATENT DOCUMENTS 4,780,204 A   10/1988   Rasmussen
4,997,555 A    3/1991   Church et al.
(Continued)

FOREIGN PATENT DOCUMENTS

CN      1455696      11/2003
CN    202036861      11/2011
(Continued)

OTHER PUBLICATIONS

State Intellectual Property Office of People's Republic of China, Notification of First Office Action for Application No. 201980062500.9, report issue date Mar. 1, 2022, China.
(Continued)

*Primary Examiner* — Waqaas Ali
(74) *Attorney, Agent, or Firm* — McDonald Hopkins LLC

(57) ABSTRACT

An aqueous fluid filter assembly with aeration mitigation includes a cap, a bowl engaging the cap and defining a filter volume, and a filter element disposed in the filter volume. The filter element is sealed against an interior of the cap and an interior of the bowl to provide an unfiltered volume and a filtered volume. An inlet is in fluid communication with the unfiltered volume and an outlet is in fluid communication with the filtered volume via a pickup section. The pickup section has a pick-up section inlet extending into the filtered volume and an air-metering orifice, wherein the air-metering orifice has a diameter less than 30% of the diameter of the pick-up section inlet and the pick-up section inlet is located below the air-metering orifice.

16 Claims, 5 Drawing Sheets

Related U.S. Application Data

(60) Provisional application No. 62/711,978, filed on Jul. 30, 2018.

(51) Int. Cl.
*B01D 35/18* (2006.01)
*B01D 53/94* (2006.01)

(58) Field of Classification Search
CPC .... B01D 29/21; B01D 19/0031; B01D 35/02; B01D 35/30; Y02A 50/20; Y02T 10/12; F01N 2610/02; F01N 3/2066; F01N 2610/10; F01N 2610/1426; F01N 2610/1486
See application file for complete search history.

(56) References Cited

U.S. PATENT DOCUMENTS

| | | | |
|---|---|---|---|
| 5,017,285 A | 5/1991 | Janik et al. | |
| 5,643,446 A | 7/1997 | Clausen et al. | |
| 5,855,772 A | 1/1999 | Miller et al. | |
| 5,904,844 A * | 5/1999 | Stone | B01D 27/06 210/232 |
| 2001/0030148 A1 | 10/2001 | Knight | |
| 2003/0226790 A1 | 12/2003 | Brown et al. | |
| 2005/0077230 A1 | 4/2005 | Jokschas et al. | |
| 2006/0196156 A1 | 9/2006 | Thomas et al. | |
| 2008/0168903 A1 | 7/2008 | Lane et al. | |
| 2008/0210618 A1 * | 9/2008 | Kiedaisch | B01D 36/003 210/321.61 |
| 2011/0056961 A1 * | 3/2011 | Amtmann | F01N 3/2066 220/592.01 |
| 2016/0317959 A1 | 11/2016 | Falc'Hon et al. | |
| 2016/0346715 A1 | 12/2016 | Koonce et al. | |
| 2017/0122170 A1 | 5/2017 | Fahrenkrug et al. | |
| 2018/0117517 A1 | 5/2018 | Tanaka | |

FOREIGN PATENT DOCUMENTS

| | | | |
|---|---|---|---|
| CN | 102389666 | 3/2012 | |
| CN | 102596355 | 7/2012 | |
| CN | 101586516 | 7/2013 | |
| CN | 103861364 | 6/2014 | |
| DE | 102012005733 | 4/2013 | |
| FR | 3057469 | 4/2018 | |
| GB | 469087 | 7/1937 | |
| SE | 1651106 A1 * | 2/2017 | |
| WO | 2012059389 | 5/2012 | |
| WO | 2018069272 | 4/2018 | |
| WO | WO-2018069272 A1 * | 4/2018 | ............. B01D 29/15 |

OTHER PUBLICATIONS

Patent Cooperation Treaty (PCT), International Search Report and Written Opinion for Application PCT/US2019/044047 filed Jan. 30, 2019, International Searching Authority, US.

* cited by examiner

AQUEOUS FLUID FILTER ASSEMBLY WITH AERATION MITIGATION

CROSS REFERENCE TO RELATED APPLICATIONS

This application is a continuation of U.S. Utility application Ser. No. 17/264,393 filed on Jan. 29, 2021, entitled "AQUEOUS FLUID FILTER ASSEMBLY WITH AERATION MITIGATION," which is a 35 U.S.C. § 371 national stage application of PCT Application No. PCT/US2019/044047 filed on Jul. 30, 2019, entitled "AQUEOUS FLUID FILTER ASSEMBLY WITH AERATION MITIGATION," which claims priority to U.S. Provisional Patent Application Ser. No. 62/711,978, filed on Jul. 30, 2018 each of which are incorporated by reference herein in their entireties.

BACKGROUND

Selective Catalytic Reduction (SCR) is an emissions control technology that has been widely deployed on diesel engine-powered ground vehicles since 2010 in the United States of America. SCR is a technology for reducing nitrogen oxide emissions by reacting them with an aqueous ammonia or aqueous urea solution in the presence of a catalyst. The aqueous urea solution is typically referred to as Diesel Exhaust Fluid, also referred to as DEF. DEF has unique properties and it is critical to the performance of the emissions systems on diesel engine equipment equipped with SCR.

A typical DEF system includes a DEF storage tank or reservoir, a filter, a pump, such as a positive displacement pump, and an injector. The DEF should be injected into the exhaust stream of the diesel engine as a fine mist. In order to produce the fine mist, the positive displacement pump draws DEF fluid from the reservoir to deliver DEF to the injector at high pressure. These pumps are prone to failure from debris as small as 40 microns. For this reason, a DEF filter rated at 40 microns or better is typically included on the suction side of the pump between the reservoir and the pump.

Experience in the laboratory and the field has shown that DEF tends to absorb or otherwise trap air in the fluid. The air may be trapped in the fluid in the form of nano-bubbles, or be dissolved in the DEF according to Henry's Law. Without limiting the invention to any particular theory of how air may be entrained in DEF, it is believed that air may be dissolved into fluid and/or air bubbles created while filing the DEF reservoir, or though agitation while the vehicle is under way, during a purge event, or entrained through other means. This entrained air may be released at very inopportune times. Certain environmental conditions can expedite the release of air from DEF. These conditions include, but are not limited to, an increase temperature or a decrease in absolute pressure. A pressure decrease will occur when there is an increase in altitude or when the DEF is being drawn by the suction side of a pump. The released air may then accumulate until a large bubble of air is withdrawn, for example, from the filter assembly, disrupting injection pressure in the DEF system.

SUMMARY

An aqueous fluid filter assembly according to one example of the present invention includes a cap, a bowl engaging the cap and defining a filter volume, and a filter element disposed within the filter volume. The bowl and filter element may be combined into a spin-on filter cartridge. The filter element is sealed against an interior of the cap and an interior of the bowl to provide an unfiltered volume and a filtered volume. An inlet is in fluid communication with the unfiltered volume and an outlet is in fluid communication with the filtered volume via a pickup section. The pickup section has a pick-up section inlet extending into the filtered volume and an air-metering orifice, wherein the air-metering orifice has a diameter less than 30% of the diameter of the pick-up section inlet and the pick-up section inlet is located below the air-metering orifice. In some examples, the air-metering orifice is about 0.005 to 0.007 inch.

The filter element may be cylindrical. The filtered volume is defined at least in part by an interior volume of the filter element. The pick-up section has a length sufficient to locate the pick-up section inlet within the interior volume of the filter element to allow for accumulation of separated air above the pick-up section inlet. A portion of the filtered volume defined by the interior volume of the cap may provide a space for air to accumulate above the pick-up section inlet.

In some examples, the interior volume of the cap includes a recess to allow for collection of separated air. The air-metering orifice may be located in the recess where separated air collects.

In some examples, the fluid filter assembly may further include a heater element. In one such example, the pick-up section inlet is located alongside the heater element. In another such example, the pick-up section inlet coaxially encloses the heater element.

In some examples, the fluid filter assembly further includes a compressible member inside the filtered volume to provide for protection against freeze damage.

In another example, an aqueous fluid filter assembly includes a cap, a bowl engaging the cap and defining a filter volume, and a filter element disposed in the filter volume, the filter element having an interior volume, the filter element being sealed against an interior of the cap and interior of the bowl, the bowl and an outer surface of the filter element cooperating to provide an outer unfiltered volume and the interior volume of the filter element and cap cooperating to provide an inner filtered volume. An inlet is in fluid communication with the outer unfiltered volume and an outlet is in fluid communication with the inner filtered volume via a pickup section. The pickup section includes a pick-up section inlet extending into the filtered volume and an air-metering orifice, wherein a diameter of the air-metering orifice is less than 30% of a diameter of the pick-up section inlet and the pick-up section inlet is located below the air-metering orifice.

BRIEF DESCRIPTION OF THE DRAWINGS

FIG. 1b is a detailed view of a portion of the fluid filter assembly illustrated in FIG. 1a.

DETAILED DESCRIPTION

Figure 1A:
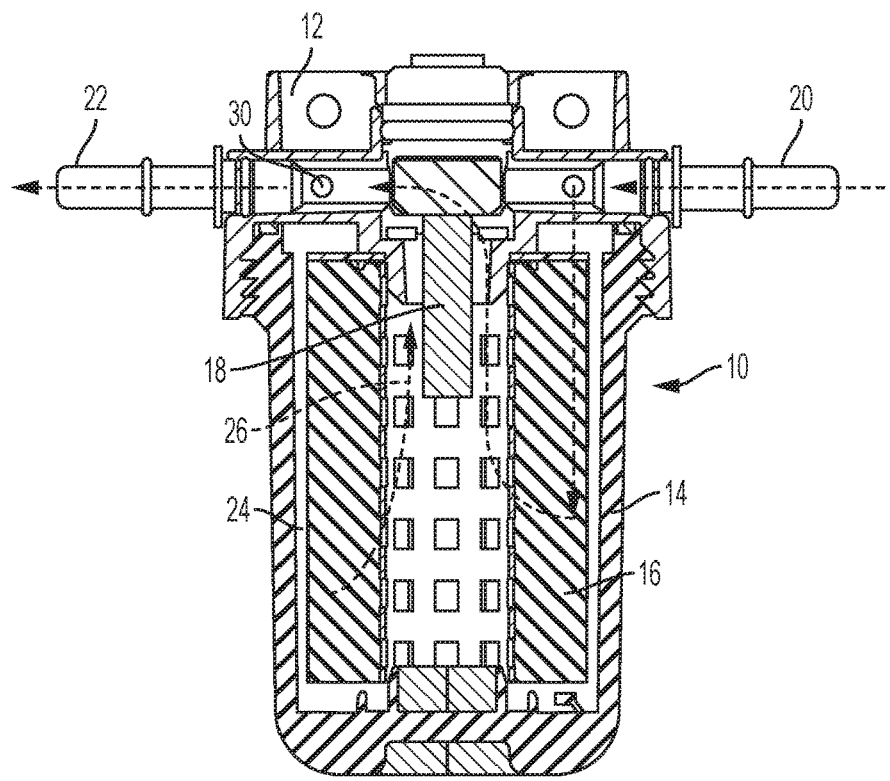
FIG. 1a is a cross section view of a known fluid filter assembly.
Figure 1B:
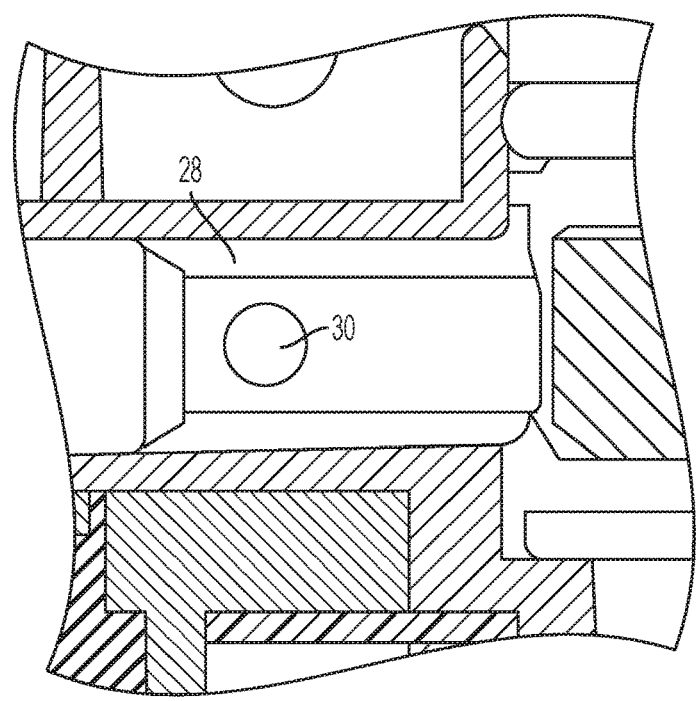

A known filter assembly 10 typical of those installed on the suction side of a DEF pump is illustrated in FIG. 1a, with additional detail shown in FIG. 1b. The filter 10 has a cap 12, bowl 14, filter element 16, heater 18, inlet 20 and outlet 22. The filter element is typically cylindrical with a hollow cylindrical interior. The ends of the filter element are sealed against the cap and bottom of the bowl. The bowl and outer cylindrical surface of the filter element 16 cooperate to provide an outer, unfiltered volume 24. The interior cylindrical volume of the filter element, bottom of the bowl and interior of the cap cooperate to provide an inner filtered volume 26. Fluid enters the inlet and flows into the outer unfiltered volume. The fluid passes through the filter element membrane and into the inner filtered volume. The outlet is in fluid communication with the top of the filtered volume by way of a tube, or an aperture in the tube sufficient for fluid flow, within the portion of filtered volume defined by the inside of the cap 12.

A filter as illustrated in FIGS. 1a and 1b maybe prone to air problems for at least two reasons. First, the membrane of the filter element may act as an air barrier. Filter elements are typically rated by particle sizes that they are capable of removing from the fluid. For example, a 40 micron filter element will remove particles of 40 microns and larger from the fluid being filtered. However, the membranes of 40 micron filter elements may also prevent entrained air from passing through the filter element. When this happens, the air accumulates in the outer unfiltered volume, typically at the top of the filter bowl. The air continues to accumulate until some, or all, of it is released around the filter element into the filtered volume, typically in a large "slug" or bubble. The "slug" of air travels to the top of the filtered volume and is withdrawn through the filter outlet tube. Once at the "slug" of air reaches the pump, the fluid pressure at the output of the pump drops, affecting injector operation, which may adversely impact emission system performance.

Second, because the filter is on the suction side of the pump, pressure within the fluid is lower than ambient pressure, especially in the inner filtered volume on the "clean" side of the filter element. Lower than ambient pressure promotes the release of air out of the liquid. Additionally, operation of the heater element in cold operating conditions may release additional dissolved air. Once the air is separated from the DEF, it tends to rise and collect at the upper sections 28 of the filtered volume in the cap. A large aperture in the outlet tube allows for proper fluid flow, but also allows air pockets to be re-introduced into the outlet flow as large "slugs" of air. The large slugs of air disrupt the pressure output and volume flow of the dosing pump. If the disruptions occur frequently enough the system may register a fault and cause reduced vehicle performance.

Figure 2:
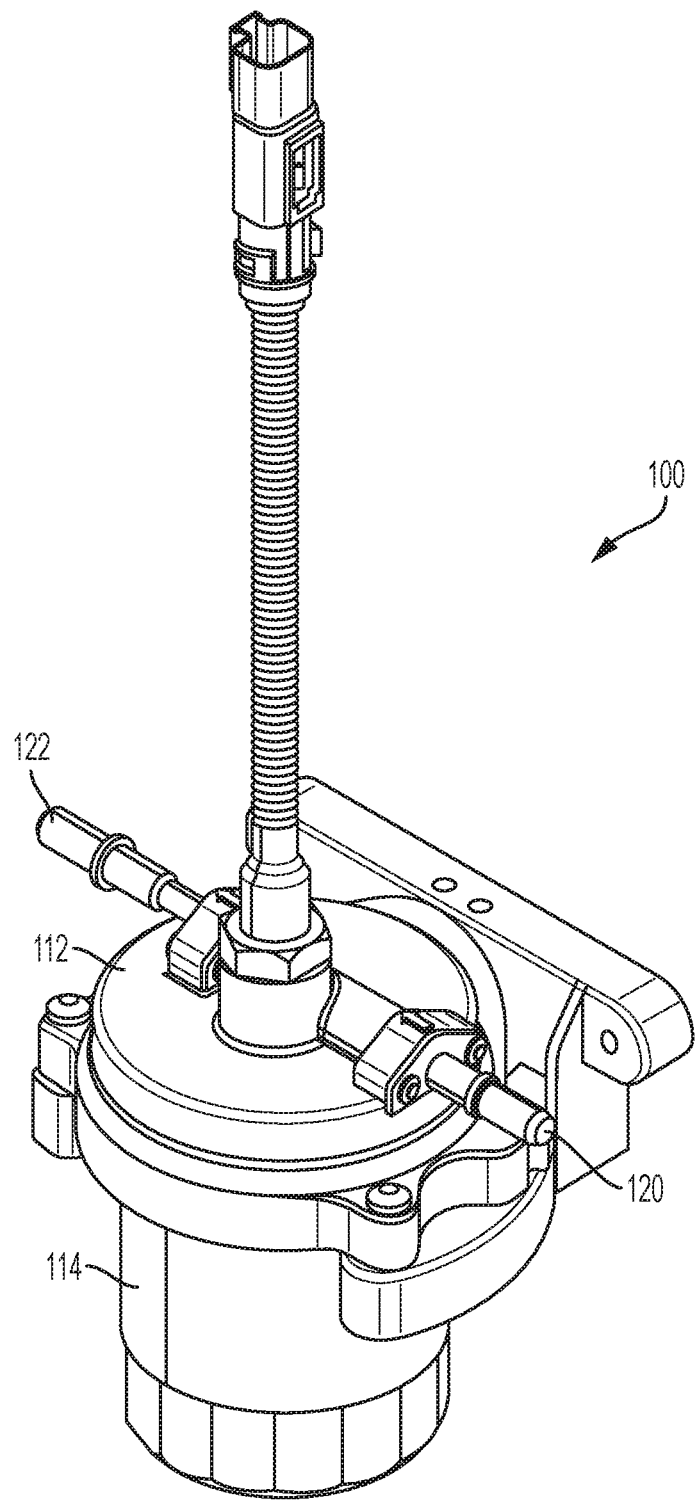
FIG. 2 is a perspective view of a fluid filter assembly according to one example of the present invention.
Figure 3A:
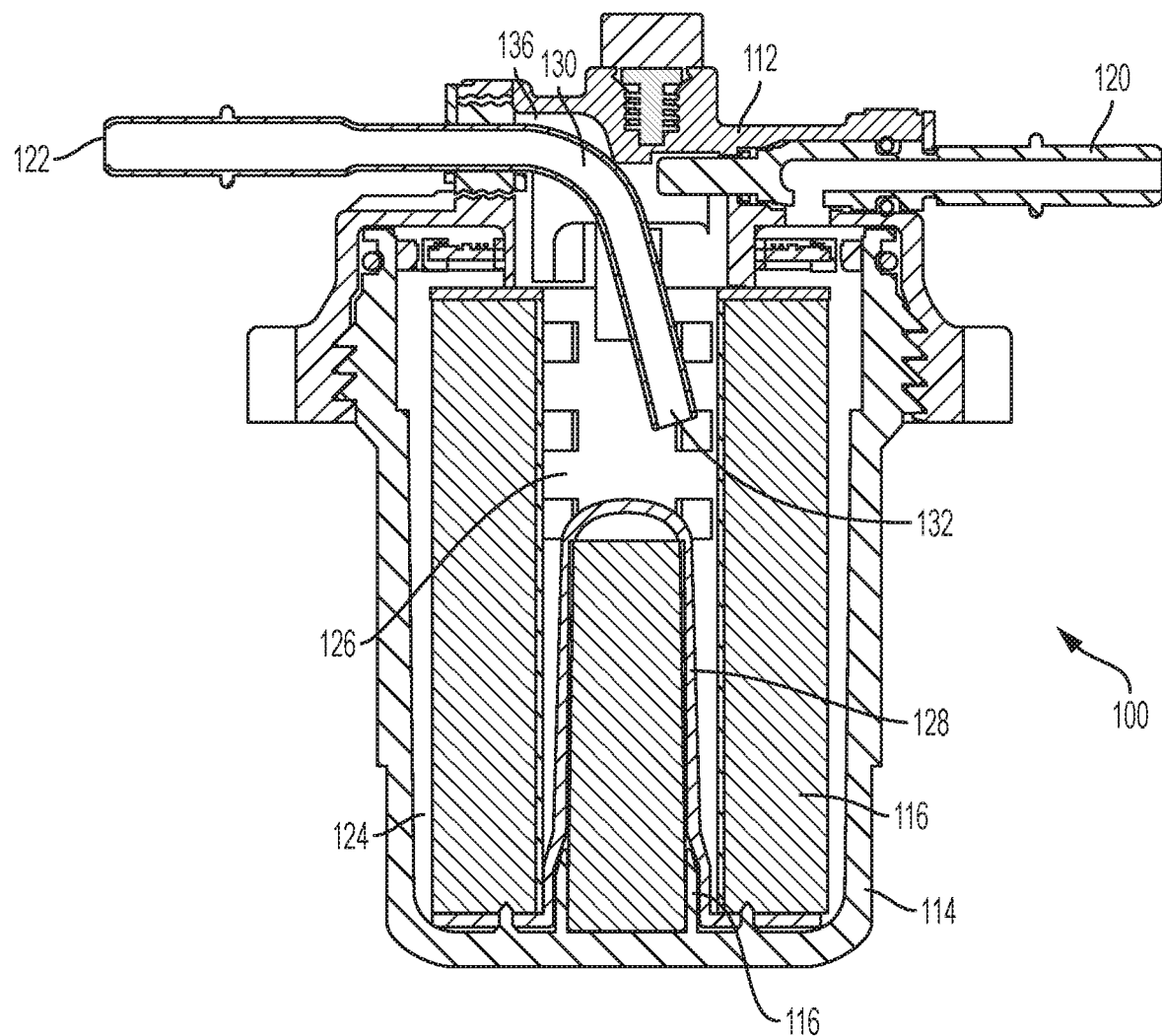
FIG. 3a is a cross section view of a fluid filter assembly of FIG. 2.
Figure 3B:
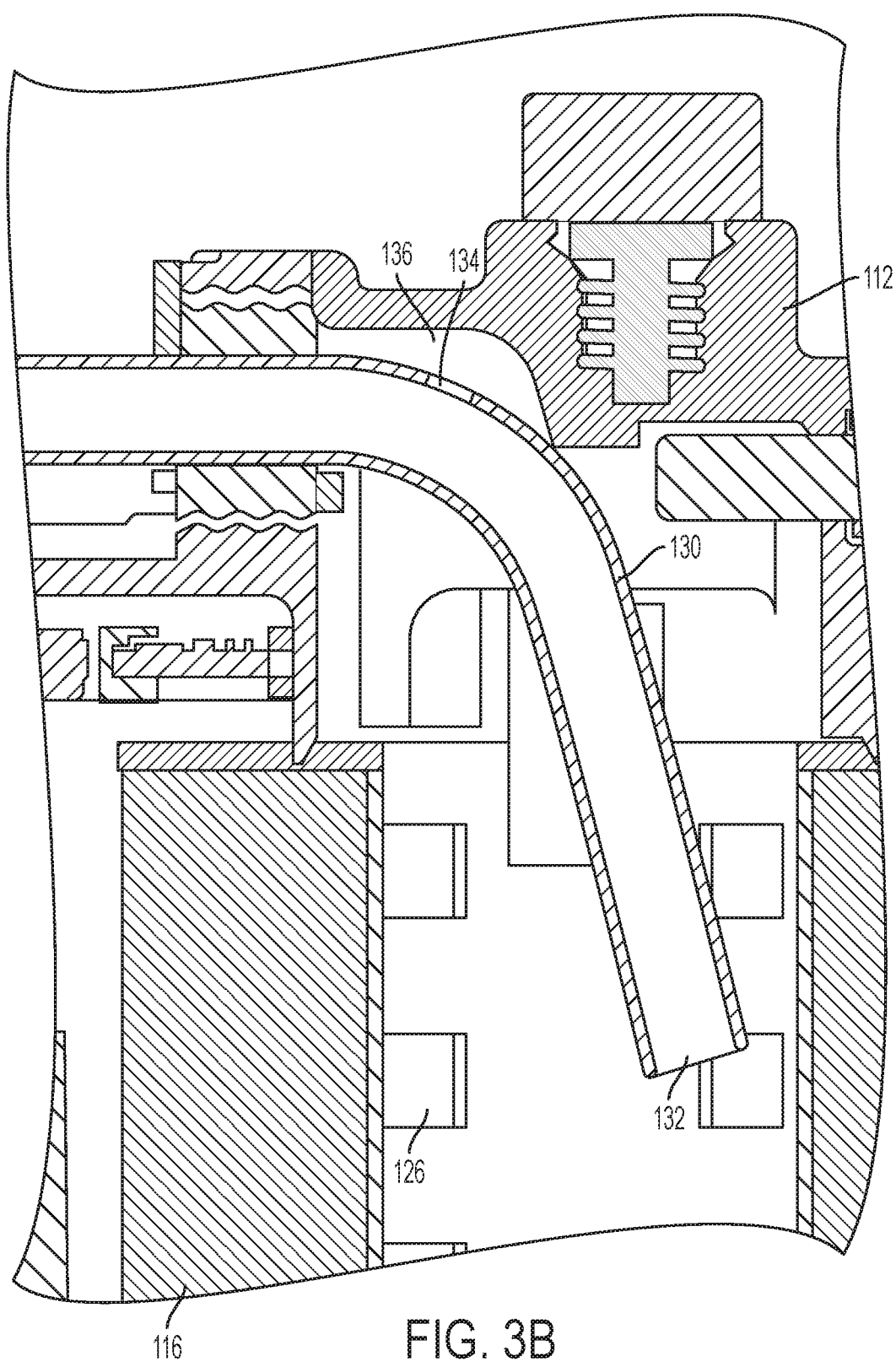
FIG. 3b is a cross section view of a fluid filter assembly of FIGS. 2 and 3a, with additional detail illustrated.

An improved aqueous DEF Fluid Filter Assembly 100 is illustrated in FIGS. 2, 3a and 3b. The Fluid Filter Assembly 100 comprises a cap 112, bowl 114, filter element 116, heater element 118, inlet 120 and outlet 122. The filter element 116 and bowl 114 may be combined in a spin-on filter cartridge. As in known DEF filters, the filter element 116 may be cylindrical with a hollow cylindrical interior volume. The ends of the filter element are sealed against the cap 112 and the bowl 114. Ends of the filter element 116 may seal against planar portions of the cap 112 and bowl 114. Additionally, or in lieu of engaging the ends of filter element 116, raised features 114a may engage and seal against side walls of filter element 116. The bowl and outer cylindrical surface of the filter element cooperate to provide an outer unfiltered volume 124. The interior cylindrical volume of the filter element, bottom of the bowl and interior volume of cap cooperate to provide an inner filtered volume 126. Fluid enters the inlet and flows into the unfiltered volume. The fluid passes through the filter element membrane and into the filtered volume.

Optionally, a portion of filtered volume 126 may be occupied by a compressible member 128 to provide for protection against freeze damage. As freezing DEF expands, the compressible member 128 compresses reducing expansion stresses on the cap 112, bowl 114, and filter element 116.

The outlet 122 is coupled to the filtered volume by an air-metering pick-up section 130. Pick-up section 130 may comprise a pick-up section inlet 132 extending into the filtered volume, preferably into a portion of the filtered volume defined by the interior cylindrical volume of the filter element. The pick-up section 130 has a length dimensioned to allow for accumulation of separated air above the pick-up section inlet 132, in the portion of the filtered volume defined by the interior volume of the cap and above filter element 116 filtered volume. The pick-up section 130 incorporates an air-metering orifice 134 above the pick-up section inlet 132 preferably in the portion of the filtered volume defined by the interior volume of the cap, to remove any air that accumulates in the interior volume of the cap at a slow, controlled rate.

The removal of air via an air-metering orifice 134 having a small diameter opening relative to the pick-up section inlet 132, at a location in the interior volume that is above the inlet of the pick-up section inlet 132, significantly reduces the potential for a "slug" of air large enough to disrupt DEF injector performance to accumulate in the filtered volume or be passed along to the injector pump. To achieve this, the air metering orifice 134 should be of a diameter insufficient for the fluid flow requirements for the DEF. For example, a diameter of the air metering orifice 134 may be less than 30% of the pick-up section inlet 132. In one example, the air-metering orifice 134 is a 0.005 inch to 0.007 inch diameter aperture in pick up section 130. Because features in the range of thousands of an inch are not readily reproducible at the scale of the drawings, the air metering orifice 134 is not illustrated in FIG. 3a, and as illustrated in FIG. 3b, is not to scale to improve the visibility of the feature.

Also illustrated in FIG. 3b is a recess 136 in filter cap 112 to provide a high point at the top of the filtered volume. Air-metering orifice 134 is located in this recess. Any separated air in the filtered volume rises and accumulates in the recess, and therefore in the vicinity of the air-metering orifice 134. This promotes metered removal of the separated air.

The example of FIG. 3a illustrates that outlet 122 and pick up section 130 may compromise a unitary tube shaped with an elbow to turn the pick up section inlet 132 into the filtered volume. Alternatively, the flow path from pick-up section 130 to outlet 122 may be constructed from multiple components. Pick up section 130 may be located adjacent to heater element 118. Additionally, a portion of inlet 120 may extend toward heater element 118 to improve thermal coupling.

Figure 4:
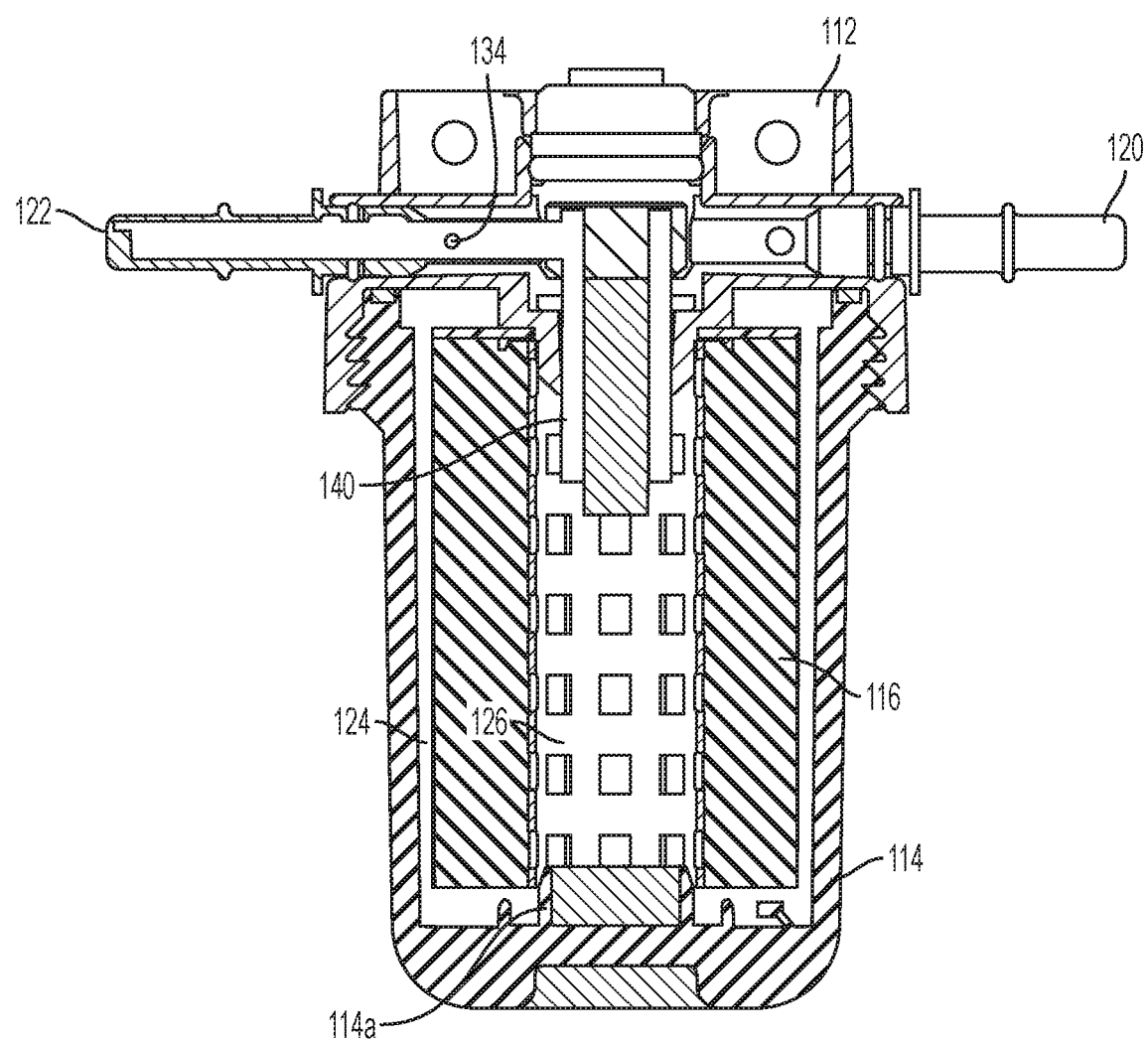
FIG. 4 is a cross section view of a fluid filter assembly according to another example of the present invention.

Another example is illustrated in FIG. 4. Elements in common with FIGS. 3a and 3b have the same reference characters and the same description applies. In the example of FIG. 4, the air-metering pick-up section 140 comprises a larger diameter pick-up section inlet 132a that is mounted coaxially with the heater element 118. Air metering orifice 134 is located on a smaller diameter tube leading to outlet 122. As in prior examples, air metering orifice 134 is much smaller in diameter than pick-up section inlet 132a. To enhance visibility, the air metering orifice 134 illustrated in FIG. 4 is not to scale.

In view of the foregoing, an improved fluid filter may comprise a cap, a bowl engaging the cap and defining a filter volume, a filter element disposed in the filter volume, the filter element being cylindrical with a hollow interior volume, the ends of the filter element being sealed against an interior of the cap and bottom interior of the bowl. The bowl and outer cylindrical surface of the filter element cooperate to provide an outer unfiltered volume. An interior cylindrical volume of the filter element, bottom of the bowl and interior volume of cap cooperate to provide an inner filtered volume. An inlet is in fluid communication with the unfiltered volume, and an outlet is in fluid communication with the filtered volume via a pickup section comprising a pick-up section inlet extending into the filtered volume and an air-metering orifice, wherein the air-metering orifice is less than 30% of the diameter of an inlet of the pick-up section and the pick-up section inlet is located below the air-metering orifice. The air-metering orifice may be about 0.005 to 0.007 inch.

The length of the pick-up section may be of a length sufficient to allow for accumulation of separated air above the pick-up section inlet, in a portion of the filtered volume defined by the interior volume of the cap and cylindrical interior volume of the filter element. The interior volume of the cap may include a recess to allow for collection of separated air. The air-metering orifice may be located in the recess.

The filter may include a heater element. The filter may also include a compressible member to provide for protection against freeze damage. The pick-up section may be located alongside the heater element. The pick-up section may coaxially enclose the heater element.

What is claimed is:

1. An aqueous fluid filter assembly, comprising:
   a bowl defining a filter volume;
   a filter element disposed in the filter volume, the filter element sealed against an interior of the bowl to provide an unfiltered volume and a filtered volume;
   an inlet in fluid communication with the unfiltered volume;
   an outlet in fluid communication with the filtered volume via a pickup section;
   the pickup section comprising a pick-up section inlet extending into the filtered volume and an air-metering orifice, wherein a diameter of the air-metering orifice is less than 30% of a diameter of the pick-up section inlet and the pick-up section inlet is located below the air-metering orifice and wherein the air-metering orifice is configured to remove air from the outlet; and
   a compressible member inside the filtered volume, wherein the compressible member is configured to compress upon expansion of freezing diesel exhaust fluid reducing expansion stress on at least one of the bowl and filter element.

2. The fluid filter assembly of claim 1, wherein the air-metering orifice is 0.005 to 0.007 inch.

3. The fluid filter assembly of claim 1, wherein the filtered volume is defined at least in part by an interior volume of the filter element and wherein the pick-up section is configured to locate the pick-up section inlet within the interior volume of the filter element.

4. The fluid filter assembly of claim 3 further comprising a cap, wherein a portion of the filtered volume which is defined by an interior volume of the cap provides space for air accumulation above the pick-up section inlet.

5. The fluid filter assembly of claim 1 further comprising a cap, wherein the interior volume of the cap comprises a recess to allow for collection of separated air.

6. The fluid filter assembly of claim 5, wherein the air-metering orifice is located in the recess.

7. The fluid filter assembly of claim 1, wherein the fluid filter assembly further comprises a heater element positioned alongside the pick-up section inlet.

8. The fluid filter assembly of claim 7, wherein pick-up section inlet coaxially encloses the heater element.

9. The fluid filter assembly of claim 1, wherein the filter element is configured to filter diesel exhaust fluid.

10. The fluid filter assembly of claim 1, wherein the filter element is cylindrical and is configured to filter diesel exhaust fluid.

11. The fluid filter assembly of claim 1, wherein the bowl and filter element are combined into a spin-on filter cartridge.

12. An aqueous fluid filter assembly, comprising:
    a bowl defining a filter volume;
    a filter element disposed in the filter volume, the filter element having an interior volume, the filter element being sealed against an interior of the bowl, the bowl and an outer surface of the filter element cooperating to provide an outer unfiltered volume and the interior volume of the filter element to provide an inner filtered volume;
    an inlet in fluid communication with the outer unfiltered volume;
    an outlet in fluid communication with the inner filtered volume via a pickup section;
    the pickup section comprising a pick-up section inlet extending into the filtered volume and an air-metering orifice, wherein a diameter of the air-metering orifice is less than 30% of a diameter of the pick-up section inlet and the pick-up section inlet is located below the air-metering orifice and wherein the air-metering orifice is configured to remove air from the outlet; and
    a compressible member inside the filtered volume, wherein the compressible member is configured to compress upon expansion of freezing diesel exhaust fluid reducing expansion stress on at least one of the bowl and filter element.

13. The fluid filter assembly of claim 12, wherein the air-metering orifice is 0.005 to 0.007 inch.

14. The fluid filter assembly of claim 12, wherein the pick-up section is configured to locate the pick-up section inlet within the interior volume of the filter element.

15. The fluid filter assembly of claim 12 further comprising a cap, wherein the interior volume of the cap comprises a recess to allow for collection of separated air and wherein the air-metering orifice is located in the recess.

16. The fluid filter assembly of claim 12, wherein the bowl and filter element are combined into a spin-on filter cartridge.

* * * * *